(12) United States Patent
Singh et al.

(10) Patent No.: US 9,976,650 B1
(45) Date of Patent: May 22, 2018

(54) FORKLESS SYNCHRONIZER WITH SENSOR RAIL ARRANGEMENT

(71) Applicant: Deere & Company, Moline, IL (US)

(72) Inventors: Harmanpreet Singh, Pune (IN); Poongundran Ganapathi, Kallakurichi (IN); Matthew B. Winhold, Waterloo, IA (US); Andrew K. Rekow, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days. days.

(21) Appl. No.: 15/421,739

(22) Filed: Feb. 1, 2017

(51) Int. Cl.
| F16H 63/24 | (2006.01) |
| F16H 63/32 | (2006.01) |
| F16H 63/30 | (2006.01) |

(52) U.S. Cl.
CPC ......... *F16H 63/24* (2013.01); *F16H 63/3069* (2013.01); *F16H 63/32* (2013.01); *F16H 2063/303* (2013.01)

(58) Field of Classification Search
CPC .......... F16D 23/02; F16D 23/04; F16D 23/06; F16D 2300/18; F16D 2023/0693; F16D 2023/0631; F16D 2500/5012; F16H 63/30; F16H 63/3023; F16H 63/3026; F16H 2063/3093
USPC .............................. 74/329, 473.11, 325, 339
See application file for complete search history.

(56) References Cited

U.S. PATENT DOCUMENTS

| 4,131,185 | A | * | 12/1978 | Schall | ................... | F16D 23/04 |
| | | | | | | 192/48.614 |
| 4,706,519 | A | * | 11/1987 | Beim | ................... | F16H 63/3023 |
| | | | | | | 192/3.63 |
| 5,566,805 | A | * | 10/1996 | Sommer | ................ | B60K 17/34 |
| | | | | | | 192/48.604 |
| 6,202,812 | B1 | * | 3/2001 | Semke | .................... | F16D 11/10 |
| | | | | | | 192/48.91 |
| 7,559,415 | B2 | * | 7/2009 | Braford, Jr. | ............. | F16D 23/06 |
| | | | | | | 192/53.32 |
| 8,258,779 | B2 | * | 9/2012 | Wenzel | ................... | F16H 59/70 |
| | | | | | | 324/207.2 |

(Continued)

FOREIGN PATENT DOCUMENTS

| DE | 10206584 A1 | * | 9/2003 | ............. F16D 23/06 |
| DE | 10333948 A1 | * | 2/2005 | ............. F16D 23/04 |
| WO | WO 201610515 A1 | * | 6/2016 | ............. B62D 49/00 |

OTHER PUBLICATIONS

Deere & Company, pending Utility U.S. Appl. No. 15/187,636, "Hydraulic Synchronizer", filed Jun. 20, 2016.

*Primary Examiner* — Ha Dinh Ho
*Assistant Examiner* — Bobby Rushing, Jr.
(74) *Attorney, Agent, or Firm* — Lorenz & Kopf, LLP

(57) ABSTRACT

A forkless synchronizer arrangement selectively couples one or more gears to a drive shaft that is rotatable about a rotation axis. A shift collar, rotated by the drive shaft, is configured to disengage from a first of the gears when in a first neutral axial position and to engage the first gear when in a first engaged axial position to transmit rotational input from the drive shaft to the first gear. A rail is arranged in parallel with the rotation axis. A rail arm has an end fixedly coupled to the rail and another end coupled to the shift collar to permit relative rotation and to transmit axial shifting movement to the rail in response to axial movement of the shift collar between the first engaged and neutral axial positions. A sensor proximate the rail senses an axial position of the rail.

20 Claims, 8 Drawing Sheets

(56) References Cited

U.S. PATENT DOCUMENTS 9,206,862 B2 * 12/2015 Mepham .................. F16D 23/06
2005/0274218 A1 * 12/2005 Birkel ..................... F16H 59/70
74/473.24

* cited by examiner

FORKLESS SYNCHRONIZER WITH SENSOR RAIL ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to synchronizer arrangements for meshing a drive input with one or more gears of a transmission, and particularly to forkless synchronizers for work vehicles.

BACKGROUND OF THE DISCLOSURE

Various transmission assemblies, such as those used in the drivetrains of various work vehicles, may include transmissions that incorporate "synchronizers" that facilitate the selective coupling of a rotating drive shaft (e.g., powered by an engine or drive motor) with one or more range gears. Often, the synchronizers are actuated by a shift fork that rides along a shift rail to move a shift collar splined to the drive shaft into meshing engagement with a gear to transmit rotational power from the drive shaft to the gear, and thereby initiate or effect a change in range speed and torque to the wheels or tracks of the work vehicle. Reversing actuation of the shift fork disengages the shift collar from the gear, and thus the transmission from the drive shaft until another gear is engaged. The shift fork may be actuated manually or under power (e.g., via hydraulic power). In some cases, the shift fork may be eliminated and the shift collar may be engaged with the gear by a hydraulic piston arrangement and disengaged by other mechanical means (e.g., return springs).

SUMMARY OF THE DISCLOSURE

The disclosure provides a forkless synchronizer assembly, such as for transmissions and the like in work vehicles.

One aspect the disclosure provides a forkless synchronizer arrangement for selectively coupling one or more gears to a drive shaft that is rotatable about a rotation axis. The synchronizer arrangement includes a shift collar rotated by the drive shaft and configured to disengage from a first of the gears when in a first neutral axial position and to engage the first gear when in a first engaged axial position to transmit rotational input from the drive shaft to the first gear. A rail is arranged in parallel with the rotation axis. A rail arm has an end fixedly coupled to the rail and another end coupled to the shift collar to permit relative rotation and to transmit axial shifting movement to the rail in response to axial movement of the shift collar between the first engaged and neutral axial positions. A sensor is arranged proximate the rail to sense an axial position of the rail.

Another aspect the disclosure provides a forkless synchronizer arrangement for selectively coupling a first gear or a second gear to a drive shaft that is rotatable about a rotation axis. The synchronizer arrangement includes first and second rails arranged in parallel with the rotation axis. A first shift assembly, concentrically disposed about and rotated by the drive shaft, is configured to disengage from the first gear when in a first neutral axial position and to engage the first gear when in a first engaged axial position to transmit rotational input from the drive shaft to the first gear. The first shift assembly has a first rail arm coupled to the first rail to transmit axial shifting movement to the first rail in response to axial movement of the first shift assembly between the first engaged and neutral axial positions. A second shift assembly, concentrically disposed about and rotated by the drive shaft, is configured to disengage from the second gear when in a second neutral axial position and to engage the second gear when in a second engaged axial position to transmit rotational input from the drive shaft to the second gear. The second shift assembly has a second rail arm coupled to the second rail to transmit axial shifting movement to the second rail in response to axial movement of the second shift assembly between the second engaged and neutral axial positions. First and second sensors are arranged proximate the respective first and second rails to sense axial positions of the first and second rails.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
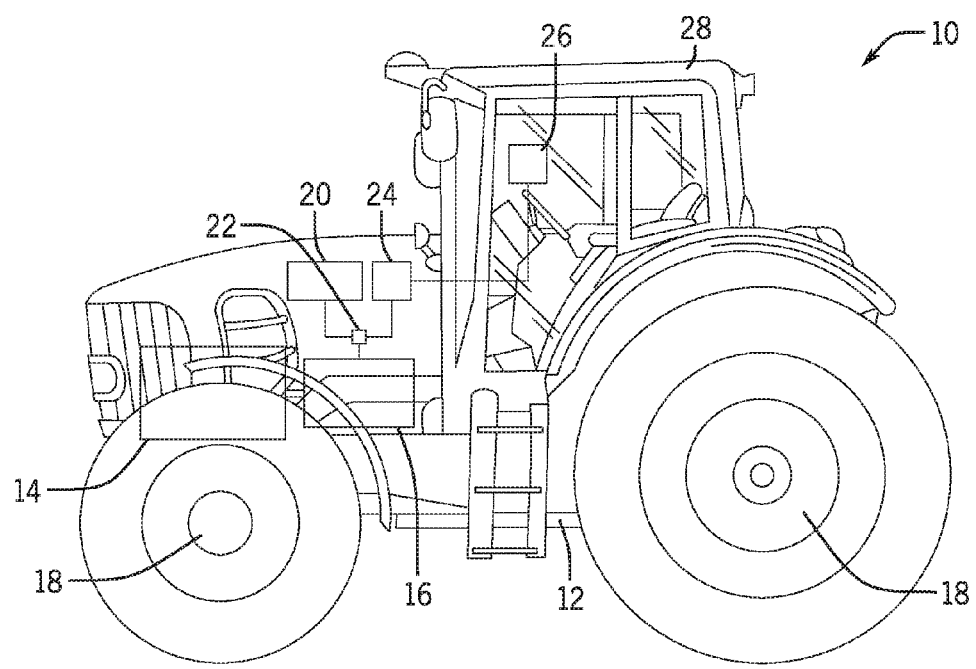
FIG. 1 is side elevational view of a work vehicle in the form of an agricultural tractor in which a forkless synchronizer according to this disclosure may be incorporated.

The following describes one or more example embodiments of the disclosed forkless synchronizer arrangement, as shown in the accompanying figures of the drawings described briefly above. Various modifications to the example embodiments may be contemplated by one of skill in the art.

The term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial"

direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Additionally, the terms "spline" and splined annulus" and derivatives as used herein include any conventional mechanical connection for transferring torque from one rotating component to another rotating component that is mounted to the torque-transferring rotating component and in the direction of rotation. This may include various known spline configurations, such as parallel splines, involute splines, crowned splines, serrated splines, helical splines and ball splines. This may also include various key and toothed arrangements of various configurations. Thus, these terms do not necessarily specify a particular profile of the intermeshing features and grooves nor a particular mode by which rotational torque is transferred (e.g., key and groove engagement, mating tooth face contact and so on). The terms "annulus" and "annuli" refer to the arrangement of the intermeshing features and grooves, whatever the configuration, in a cylindrical path about the rotating component.

Certain known synchronizers serve to couple the downstream driveline of a vehicle to the engine output shaft by movement of a shift rail and fork arrangement, which may be manually or semi-automatically actuated. Generally, for example, one or more fork elements may ride along one or more shift rails to displace a synchronizer mechanism into engagement with a drive gear of a transmission (e.g., by meshing synchronizer splines with gear splines). The synchronizer may be coupled for co-rotation with the drive shaft, and thus, the engagement of the synchronizer with the gear also couples the gear to the drive shaft for co-rotation, thereby incorporating the gear into the rotational power (or torque) path from the engine. A blocking member may be arranged between the synchronizer and the gear to inhibit displacement of the synchronizer until its splines are clocked with the splines of the gear. The engagement and disengagement of the gear may be thus largely, if not entirely, mechanical in the sense that the shift rail actuates the synchronizer back and forth with respect to the gear. The shift rails and forks add to the complexity of the assembly as well as the weight and space taken up by the assembly within the vehicle.

Certain other known synchronizers have been devised that use fluid power (e.g., hydraulic power) to couple transmission gears to the engine output shaft. Some of these use a shift rail and fork assembly similar to that described above, although shift fork movement is effected hydraulically. Other systems eliminate the shift rail and fork arrangement entirely. Instead, these "forkless" systems route hydraulic fluid into chambers that drive pistons to displace shift collars into engagement with the gears. A shift collar may be disengaged from a gear by venting the pressure chamber so that one or more return actuation springs acting on the piston may move the shift collar back to a neutral position. These systems may thus be thought of as hybrid mechanical-hydraulic systems in that each mode plays a part in the actuation of the shift collars (i.e., the shift collars are hydraulically engaged and mechanically (spring) released). The spring mechanism adds to manufacturing and assembly complexities and renders the synchronizer susceptible to failure (e.g., by breaking or "sticking" of the springs).

This disclosure addresses certain of the issues noted above and may provide for various additional benefits. Generally, disclosed herein is a synchronizer arrangement that, instead of being driven by one or more rail-mounted fork members, is configured to drive or impart movement to the one or more rails, the positions of which are sensed and used as input to an electronic controller as representations of synchronizer positioning, and thereby, representations of the state of engagement of a gear of the transmission. Thus, rather than eliminating the rails as well as the forks, the disclosed forkless synchronizer arrangement utilizes rails as part of an input feed to monitor and control the transmission.

Since the rails are used only for positioning sensing only, they are not required to support or transmit loads associated with transmission shifting as in conventional forked synchronizer arrangements. Thus, while the rails remain present, their load-carrying function has been eliminated, which reduces the part-count of load-carrying, wear components compared to conventional forked synchronizer arrangements, thereby improving the operational life of the synchronizer and the transmission. Further, while the rails remain, conventional forks have been eliminated, which may reduce the space envelope of the assembly, particularly in the radial dimension, thereby providing a more compact arrangement compared to conventional forked synchronizers.

One or more embodiments of a forkless synchronizer arrangement are disclosed herein that operate under hydraulic power to displace one or more shift collars into both the engaged and disengaged positions with respect to one or more gears of a transmission assembly. It should be understood, however, that forkless synchronizer arrangements other than those constructed as the embodiments described herein may also incorporate aspects of this disclosure, including such forkless synchronizers that are not hydraulically actuated or that are hydraulically actuated but have synchronizer components that vary from that described.

In certain embodiments, an electro-hydraulic synchronizer is operable to selectively couple one or more gears to a drive shaft via a splined shaft hub rotated by the engine drive shaft. A splined ring and shift collar assembly may be disposed about the shaft hub and movable along the shaft axis with respect to the shaft hub. The shift collar splines may engage the shaft hub and, when the ring is in an engaged axial position, a gear. The shift collar may be disengaged from the splined annulus of the shaft hub when the ring is in a neutral position. The shift collar thus transmits rotational input from the shaft hub to the gear when the ring is in the engaged axial position. A second ring and shift collar may be provided to selectively couple a second gear to the shaft hub in which case the synchronizer may alternatively couple either of two different gears to the engine. Hydraulic pistons (e.g., a dual-acting or two-way piston arrangement) may receive hydraulic fluid to move the ring(s) to the engaged and neutral axial positions. In certain embodiments, a spring-biased blocking ring may be interposed between each shift collar and the associated gear to inhibit the ring from moving to the engaged axial positon until an inner splined annulus of the shift collar is rotationally aligned with a splined annulus of the gear. The blocking ring may be configured to rotationally index relative to the shift collar to permit alignment and engagement of the splines of the shift collar with the splines of the gear.

Also, in certain embodiments the sensor rail arrangement of the disclosed forkless synchronizer may interface directly with the ring or shift collar components in such a way as to allow for relative rotation of the ring and shift collar while transmitting axial translation from the ring and shift collar to the rail. The synchronizer may, for example, include rail arms, each of which is fixed at one end, directly or indirectly, to a rail and at another end coupled, directly or indirectly, to a ring or shift collar to allow relative rotation. This rotational connection, for example, may be a direct coupling in which an arcuate end of a rail arm interfaces with a circumferential feature of a ring. In one embodiment, the arcuate end of the rail arm fits within a radially outwardly opening grove extending continuously or intermittently along the outer circumference of the ring.

The sensor rail arrangement may include one or more sensors utilizing any technology available to detect the absolute or relative axial position, or change in axial positon, of the rails. For example, the sensors may be one or more of various position sensors, including linear or other proximity sensors using electromagnetic coupling (e.g., LVDT and Hall Effect sensors), capacitive, infrared, ultrasound, laser, and/or other sensing technology. The one or more sensors may be mounted in a fixed or relatively movable relationship to the rails, for example, being mounted directly to the rails or to surrounding structure (e.g., a sensor rail (or other) housing). In the latter case, the one or more sensors would be arranged to detect the absolute or relative positon of the rails, while in the former the one or more sensors would detect surrounding structure other than the rails (e.g., a housing). A region of interest for detection by the one or more sensors may be formed in or attached to either the rails or the surrounding structure to provide a certain feedback to the one or more sensors (e.g., a stronger, more consistent and more linear signal to the sensor(s)). For example, a profiled groove (e.g., a "V" groove) may be formed in each rail with the valley being either troughed (i.e., flat-bottomed) or sharply angled and either aligned with the rail axis or at an angle (e.g., 90 degrees) thereto. Sensor pairings (e.g., transmitter/receiver or transducer pairs) may be used in which one of the pair is mounted to a rail and the other of the pair is mounted elsewhere.

Referring now to the drawings, the disclosed forkless synchronizer may be utilized in the context of a wide range of work vehicles, including, agricultural tractors, such as shown in FIG. 1. In this regard, while a tractor is illustrated and described herein as an example work vehicle, one skilled in the art will recognize that principles of the forkless synchronizer arrangement disclosed herein may be readily adapted for use in other types of work vehicles, including, for example, various other agricultural machines, and other vehicles or stationary machines used in the construction, forestry or other industries. As such, the present disclosure should not be limited to applications associated with a tractor or the particular example tractor shown and described.

As shown in FIG. 1, the work vehicle 10 includes a vehicle frame 12. Supported on the vehicle frame 12 is a source of propulsion 14 that supplies power to a transmission 16. In one example, the source of propulsion 14 is an internal combustion engine, such as a diesel engine, that is controlled by an engine control module. It should be noted that other forms of propulsion may be provided, such as a fuel cell, an electric motor, a hybrid gas-electric power plant, etc. The transmission 16 transfers the power from the engine to a suitable driveline coupled to one or more driven wheels 18 of the work vehicle 10 to enable the work vehicle 10 to travel over the terrain. The work vehicle 10 includes an electrohydraulic system with one or more hydraulic pumps 20 and electrohydraulic valves 22 operated by one or more controllers 24 to control operational modes of the transmission 16. Information related to the transmission (e.g., current drive mode or gear) may be relayed to the operator via an operator interface 26 (e.g., display screen) in an operator cabin 28.

Figure 2:
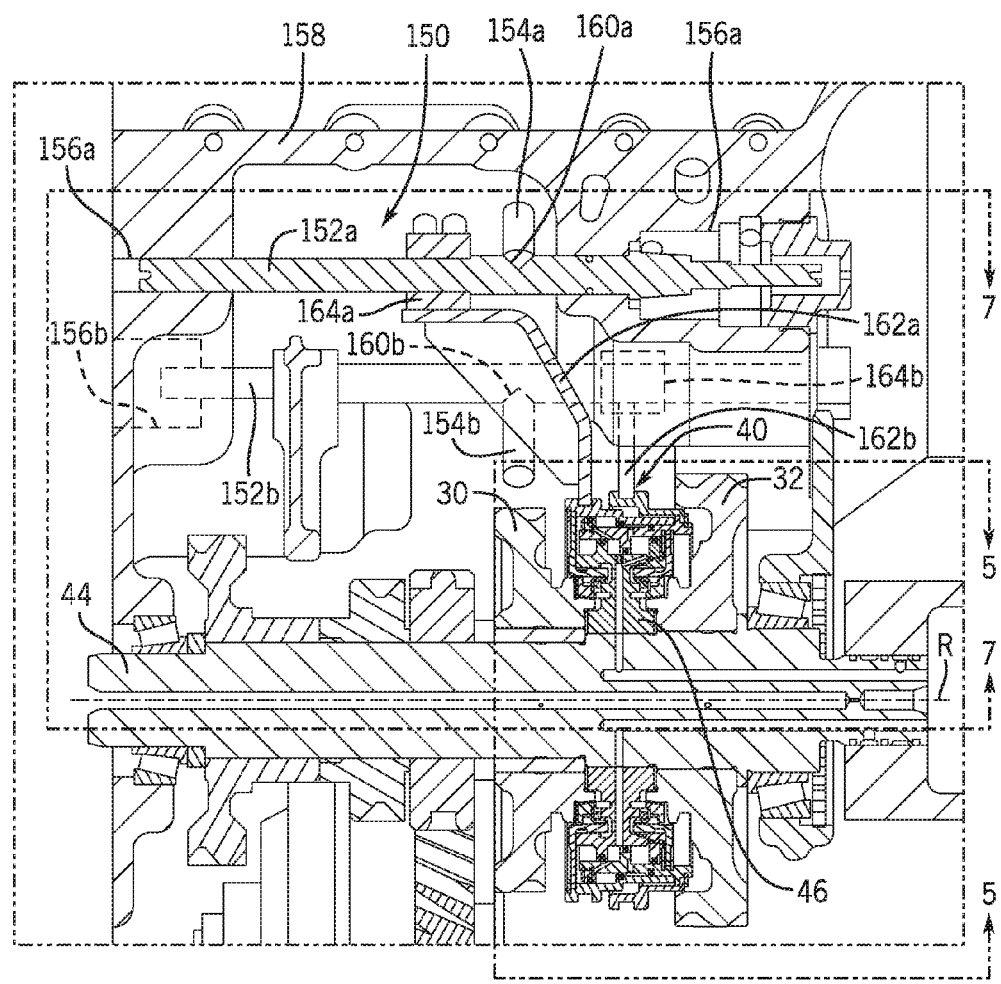
FIG. 2 is a partial sectional view showing an example transmission assembly for the work vehicle of FIG. 1 having an example forkless synchronizer arrangement according to this disclosure.
Figure 3:
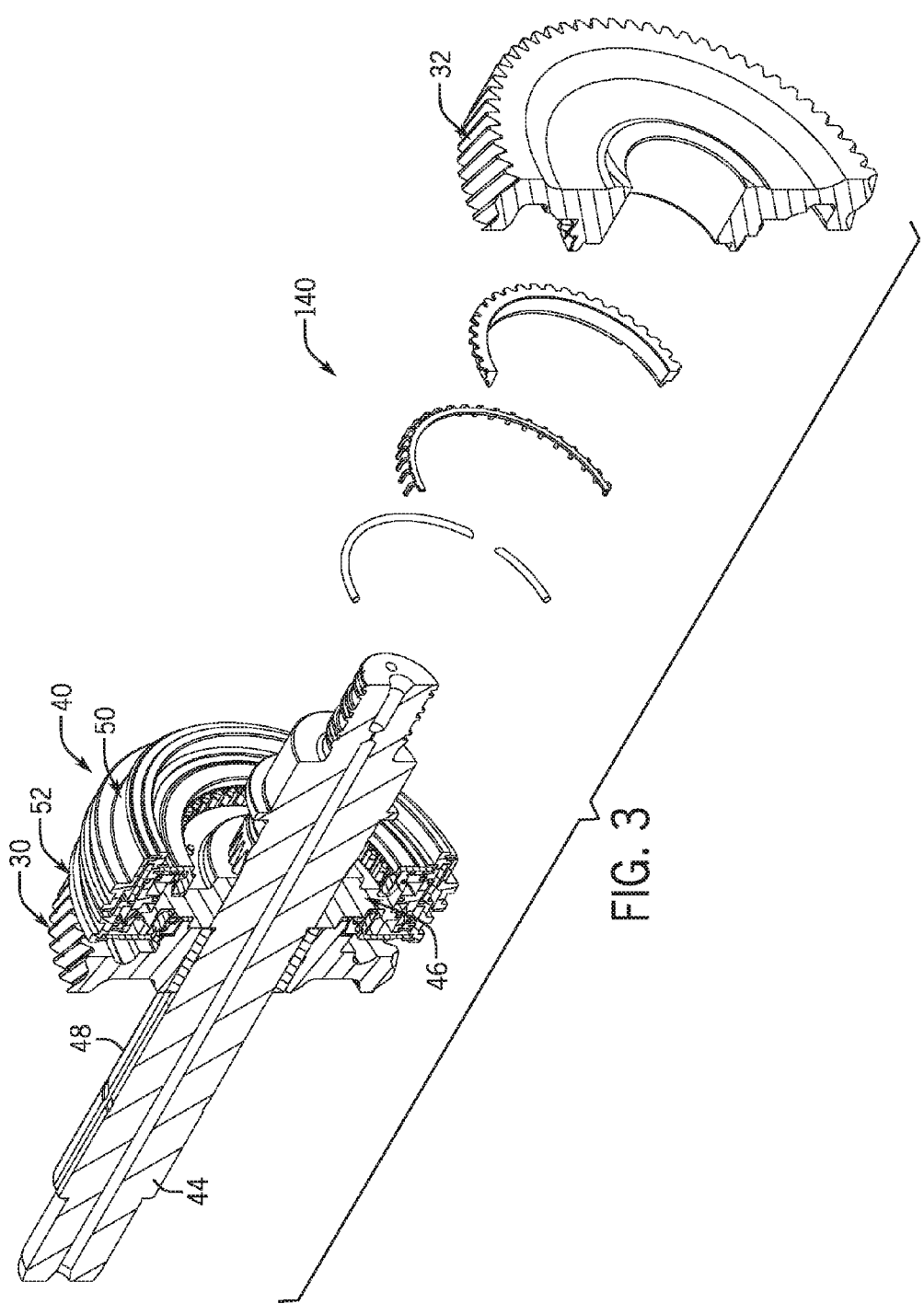
FIG. 3 is a perspective assembly view showing certain components of the example forkless synchronizer arrangement in cross-section.

Referring now also to FIGS. 2 and 3, the transmission 16 may include one or more gears for forward and rearward motion of the work vehicle 10, including multiple forward range gears, such as gears 30, 32, for propelling the work vehicle 10 at various speeds. In order to transition between gears, such as between the gears 30, 32, the transmission 16 may include one or more synchronizers, such as synchronizer 40 disposed axially between the gears 30, 32, all of which may be concentric with a rotation axis R extending from a drive shaft 44 providing power output from the engine. The gears 30, 32 may be mounted directly to smooth sections of the drive shaft 44, or on various bushings or collars, so that that the drive shaft 44 may be rotated relative to the gears 30, 32 until whichever one (but not both) of the gears 30, 32 is engaged by the synchronizer 40. The synchronizer 40 may be mounted to the drive shaft 44 by a shaft hub 46 or the like that is mounted to the drive shaft 44 for co-rotation at all times, such as via mating splines 48, or via other mating toothed or multi-sided sections of the drive shaft 44 and the shaft hub 46. In this way, engine torque is applied through the drive shaft 44 and shaft hub 46 to the synchronizer 40, and when engaged, to one of the gears 30, 32.

Figure 4:
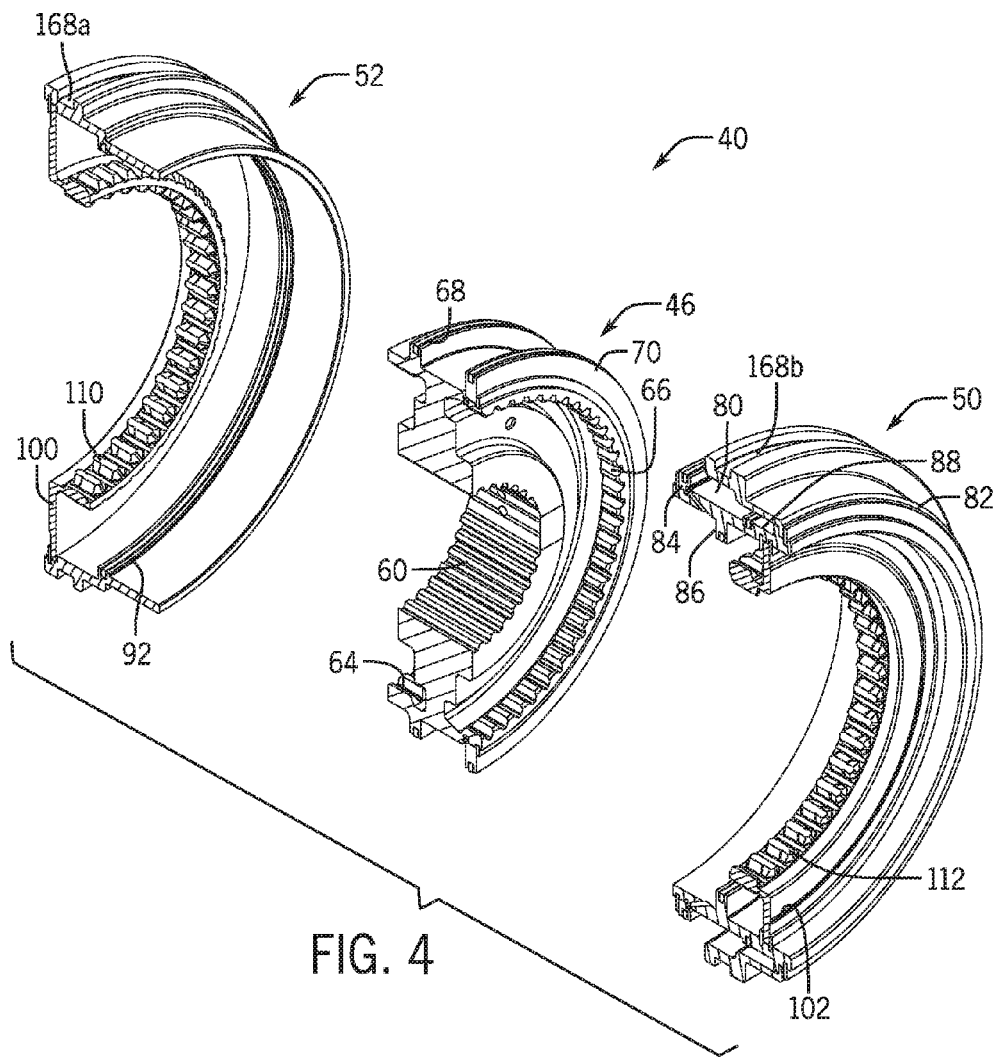
FIG. 4 is another sectional perspective assembly view thereof.
Figure 5:
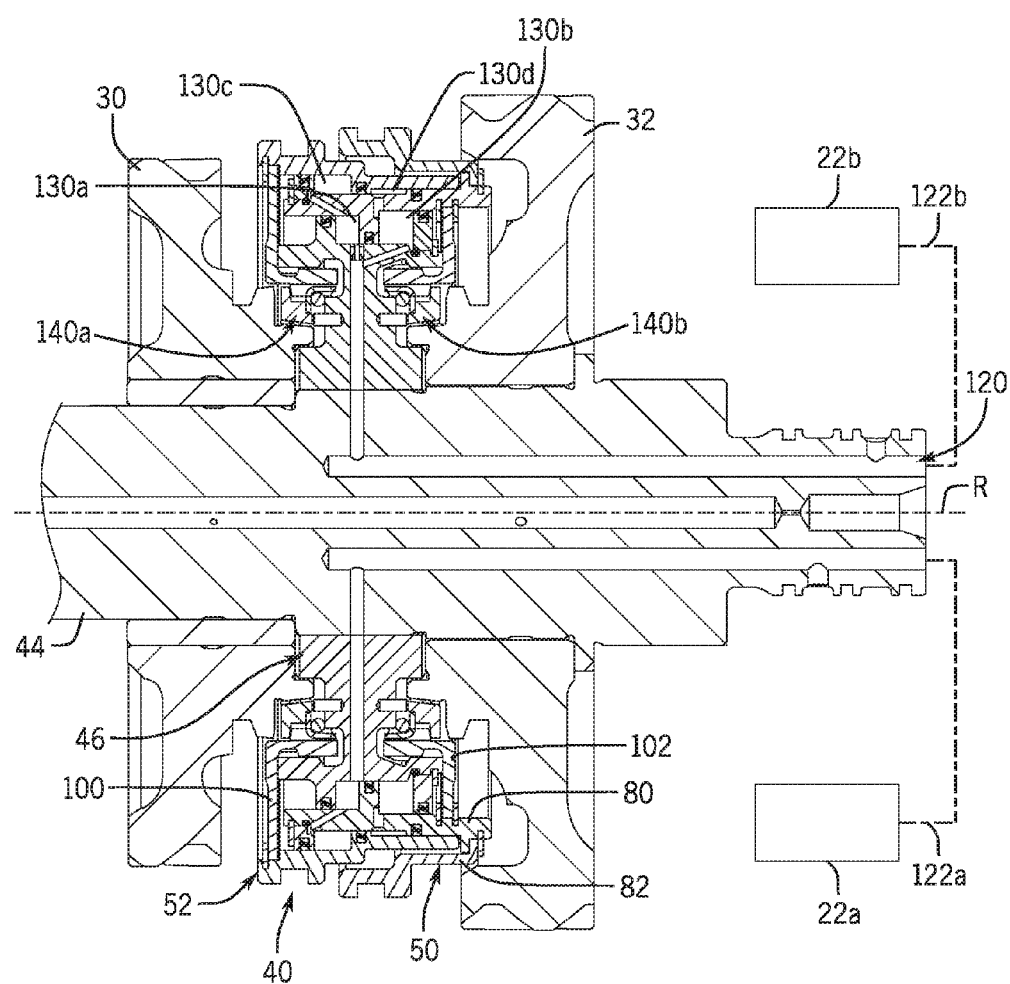
FIG. 5 is a partial section view taken along path 5-5 of FIG. 2 showing the example forkless synchronizer in a neutral state.

Referring now also to FIGS. 4 and 5, the example synchronizer 40 includes two annular bodies or rings mounted to the shaft hub 46, specifically an inner ring 50 that nests radially within an outer ring 52 and configured so that they may move in the axial direction relative to one another and the shaft hub 46. The assembly of the rings 50, 52 to the shaft hub 46 forms multiple fluid chambers in which hydraulic fluid may be directed in a controlled manner to move either the inner ring 50 or the outer ring 52 axially away from the shaft hub 46 during shifting (i.e., coupling of one of the gears 30, 32 with the drive shaft 44). Controlled venting and filling of one or more the fluid chambers causes the axially shifted ring 50, 52 to return to a neutral position as well as to shift the other ring 50, 52 axially during shifting into the other gear 30, 32.

The illustrated example of the synchronizer 40 will now be described in detail for purposes of specifying one or more example arrangements for carrying out the principles of this disclosure. Further structural and operational details of the example synchronizer 40 may be found at co-pending and co-owned application Ser. No. 15/187,636, filed Jun. 20, 2016, which is incorporated by referenced in its entirety as though fully set forth herein. It will be understood, however, that other synchronizer arrangements may be devised without departing from the scope of this disclosure.

As shown, the shaft hub 46 is an annular component with a splined central annulus 60 in which the splines project in the direction toward the rotation axis R so as to engage the radially outward projecting splines 48 of the drive shaft 44 so that they mate in interleaving fashion sufficient to transfer rotational torque from the engine. From the central annulus 60, the shaft hub 46 extends radially outward along an axially narrowed body to a widened annular periphery. The annular periphery defines a pair of spaced apart splined annuli 64, 66, one on each axial side of a radial plane bisecting the shaft hub 46. The splined annuli 64, 66 are formed on an inside periphery of the annular periphery so that the splines project radially inward toward the rotation axis R. Two spaced apart annular walls 68, 70 project radially outward from an outer side of the annular periphery, with a generally smooth cylindrical wall there between. The walls 68, 70 have grooved ends supporting seals. In certain embodiments, the shaft hub 46 may be formed primarily as a single, monolithic structure with the exception of the wall 70 being a separate piece (e.g., retained by a snap ring and sealed by an O-ring).

The inner ring 50 is an annular component with a main ring body 80 and a ring extension 82. The ring body 80 has two axially spaced annular walls 84, 86 extending radially inwardly and outwardly on radially inward and outward sides of the ring body 80, respectively, with grooved ends that support additional seals. The ring extension 82 is radially spaced from the outer periphery of the ring body 80 except where it connects to the ring body 80. At plateau 88, the outer periphery of the ring body 80 extends radially outward further at the axial side of the ring body 80 where the ring extension 82 connects, and includes a groove for another seal. In certain embodiments, the annular wall 86 and the ring extension 82 are separate pieces from the ring body 80 (e.g., connected by additional snap rings and sealed by an O-ring as shown in the illustrated example).

The outer ring 52 is an annular component with an annular wall 92 extending radially inwardly on a radially inward side of the outer ring 52 with a grooved end that supports another seal. The outer ring 52 is sized and shaped so that it fits about the ring body 80 of the inner ring 50, and in part within the space between the ring body 80 and the ring extension 82.

The inner and outer rings 50, 52 mount respective first and second shift collars 100, 102. The shift collar 100 has an angled cross-section the axial leg of which extends axially toward the shaft hub 46 and is radially spaced from the inner periphery of the ring body 80. The shift collar 100 defines a double-sided splined annulus 110 having splines projecting radially inwardly and outwardly toward and away from the rotation axis R. The shift collar 102 has an angled cross-section the axial leg of which extends axially toward the shaft hub 46 and is radially spaced from the inner periphery of the outer ring 52 and defines another double-sided splined annulus 112 having splines projecting radially inwardly and outwardly toward and away from the rotation axis R. In certain embodiments, the shift collars 100, 102 are separate pieces from the inner and outer rings 50, 52 that are connected by additional snap rings, such as shown in the illustrated example.

Hydraulic fluid may be routed to the synchronizer 40 through various internal passages, such as a network of passages 120 shown in FIG. 5 coupled to hydraulic lines 122*a*, 122*b* leading from two associated electrohydraulic valves 22*a*, 22*b*. Axial and radial fluid passages in the drive shaft 44 may communicate with axial and radial fluid passages in the shaft hub 46. In certain embodiments, various of the fluid passages of the fluid passage network 120 are formed as through or blind bores in the drive shaft 44 and the shaft hub 46 certain open ends of which may be plugged. The fluid passage network 120 delivers hydraulic fluid to hydraulic chambers defined by the assembly of the shaft hub 46 and the inner and outer rings 50, 52. The hydraulic chambers, or the components the confined fluid acts upon, work as "hydraulic pistons" or "pistons" by virtue of the pressurized fluid providing the motive force driving movement of the synchronizer 40. In the illustrated example, there are four hydraulic chambers 130*a*, 130*b*, 130*c* and 130*d*, the former two formed between the shaft hub 46 and the inner ring 50, and the latter two formed between the inner ring 50 and the outer ring 52. Various vent passages may be formed in the inner ring 50 to allow communication between the hydraulic chambers (e.g., between 130*a* and 130*c* and between hydraulic chambers 130*b* and 130*d*), and various seals provide dynamic seals between the movable parts to seal pressure in the hydraulic chambers 130*a-d*.

Generally, the shaft hub 46 is rotating during operation and does not move axially. During shifting to and from the gear 32, the inner ring 50 slides axially relative to the shaft hub 46 and the outer ring 52, which is held in its neutral position shown in FIG. 5. During shifting to and from the gear 30, the outer ring 52 slides axially relative to the shaft hub 46 and the inner ring 50, which is held in its neutral position shown in FIG. 5. The synchronizer 40 may be held in the neutral state of FIG. 5, in either of two ways, namely, by maintaining the hydraulic chambers 130*a-d* in open communication to the hydraulic pressure source (e.g., by opening or otherwise operating both of the control valves 22*a*, 22*b* in "pressure" mode), or by venting the hydraulic chambers 130*a-d* to tank (e.g., by closing or otherwise operating both of the control valves 22*a*, 22*b* in "tank" mode).

To move the inner ring 50 to the axial position necessary to engage the shift collar 102, the control valve 22*a* will be in pressure mode and the control valve 22*b* will be energized to tank mode. The hydraulic chamber 130*a* (and the hydraulic chamber 130*c* via a vent passage) are pressurized, and the hydraulic chambers 130*b*, 130*d* may be vented to tank. By returning both valves 22*a*, 22*b* to pressure mode, pressure is supplied (via the hydraulic line 122*b*) to the hydraulic chamber 130*b* (and hydraulic chamber 130*d* via a vent passage). The outer ring 52 will remain in its neutral position, and the inner ring 50 will return to its neutral position. The gear 30 is engaged by moving the outer ring 52 from its neutral position to the axial position necessary to engage the shift collar 100. This is accomplished by energizing the control valve 22*a* to tank mode and the control valve 22*b* to pressure mode, thereby pressurizing the hydraulic line 122*b*. The hydraulic chamber 130*b* (and the hydraulic chamber 130*d* via a vent passage) are pressurized, and the hydraulic chambers 130*a*, 130*c* may be vented to tank. By returning both valves 22*a*, 22*b* to pressure mode, pressure is supplied (via the hydraulic line 122*a*) to the hydraulic chamber 130*a* (and hydraulic chamber 130*c* via a vent passage). The inner ring 50 will remain in its neutral position, the outer ring 52 will return to its neutral position.

Proper intermeshing of each of the shift collars 100, 102 with its respective gear 30, 32 may be facilitated by a blocking arrangement 140 (with blocking assemblies 140*a*, 140*b* for associated shift collars 100, 102) that serves to physically interfere with axial movement of the shift collars 100, 102 (and thereby the inner and outer rings 50, 52) into the path of the gears 30, 32 until the two components are clocked such that the splines of a shift collar are axially (or rotationally) aligned with the grooves between the splines of a gear. In addition, since the shift collars 100, 102, and the entire synchronizer 40, rotate with the drive shaft 44 continuously, the blocking members are used to initiate rotation of the gears and bring them up to the speed of the drive shaft 44. Only after a pair of the shift collars 100, 102 and the associated gear 30, 32 are co-rotating in the proper clocking does the blocking arrangement permit the shift collar 100, 102 to slide axially to intermesh the splines. The aforementioned application details an example spring-biased blocking arrangement 140 that may be used in the example synchronizer 40.

Briefly, a ring of the each blocking assemblies 140*a*, 140*b* rotates with the drive shaft 44. During shifting, as a block ring is moved axial toward its gear, a tapered section of the blocking ring mates with a cone section of the gear to provide for frictional engagement as the pair of components are brought together, possibly allowing for some relative rotation (or slippage) at the early stages of engagement. Differential between the rotational speed of the blocking ring and the gear 30, 32 creates torque on the blocking ring, which causes it to rotate slightly relative to the shaft hub 46, after which it continues to co-rotate with the shaft hub 46. This positions the blocking ring in a position that interferes with the axial path of the associated shift collar 100, 102. As the shift collar 100, 102 continues to travel it applies a torque on the blocking ring tending to clear the blocking ring from the path of the shift collar 100, 102. However, this torque is resisted by torque from the engagement of the blocking ring and the gear 30, 32, which is still rotating at a different speed. Upon the gear 30, 32 being accelerated or decelerated to match the synchronizer 40 speed, the frictional torque with the gear cone dissipates to allow the shift collar 100,102 to pass through the blocking ring. The gear 30, 32 may not be clocked with the blocking ring. However, as the shift collar 100, 102 travels further, the blocking ring will index as needed until the shift collar 100,102 can fully engage with the gear 30, 32.

As previously mentioned, the forkless synchronizer includes a sensor rail arrangement that cooperates with the synchronizer to determine the state of engagement of the transmission. The sensor rail arrangement may be part of a feed loop to the controller 24 (e.g., being either a master vehicle controller or a dedicated sub-system controller such as a transmission or engine controller) to provide an input signal indicative of the state of the transmission and/or confirmation of gear selection. The controller 24 may use this feedback to control operation of the electrohydraulic system, and the control valves 22 in particular. The controller 24 may also output a feedback signal to the operator interface 26 to provide the operator with a visual indication of the current gear engaged. The controller 24 may also monitor the feed signals from the sensor rail arrangement for operational anomalies or for diagnostic purposes.

Figure 6:
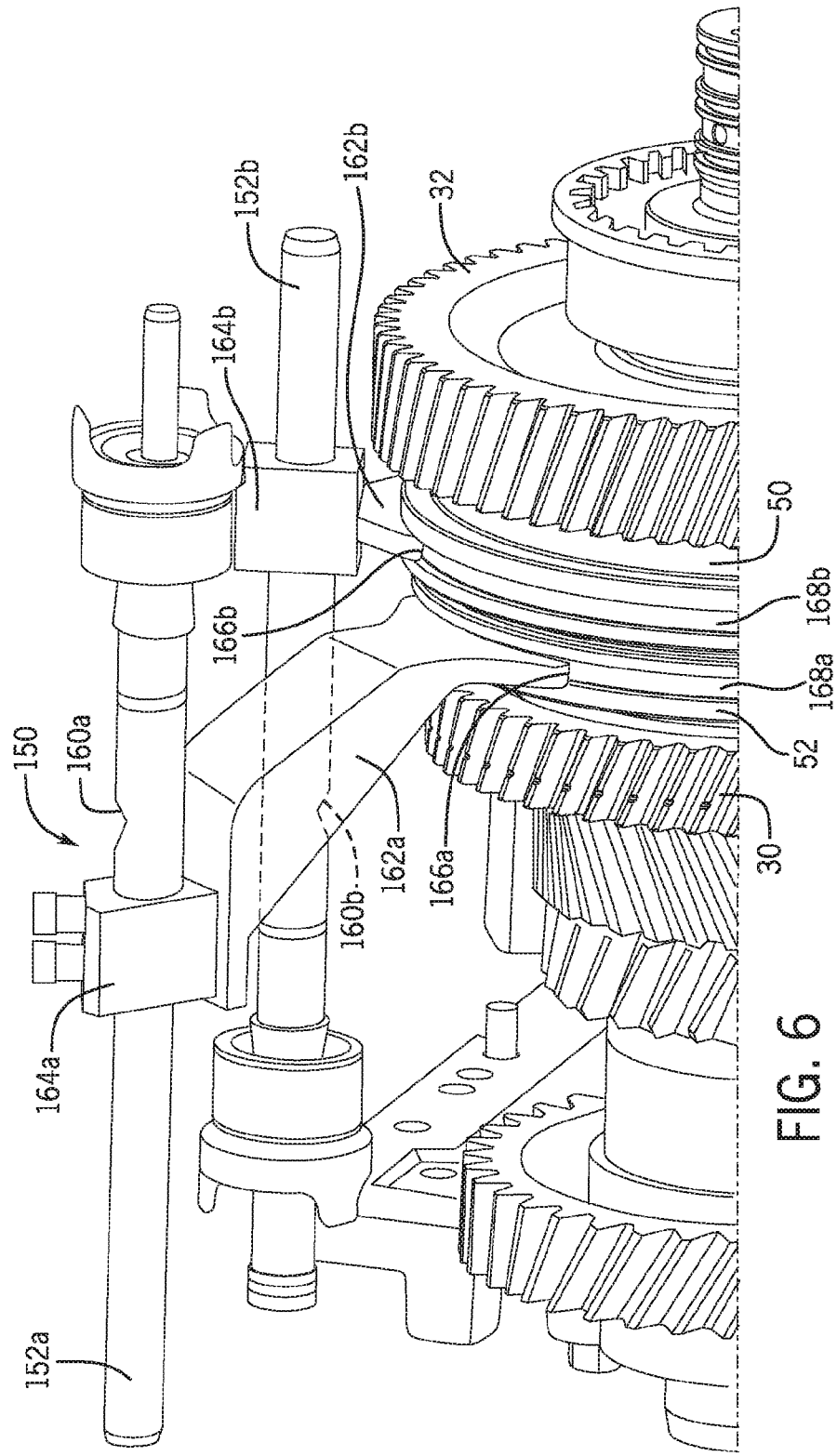
FIG. 6 is a partial perspective view thereof.
Figure 7:
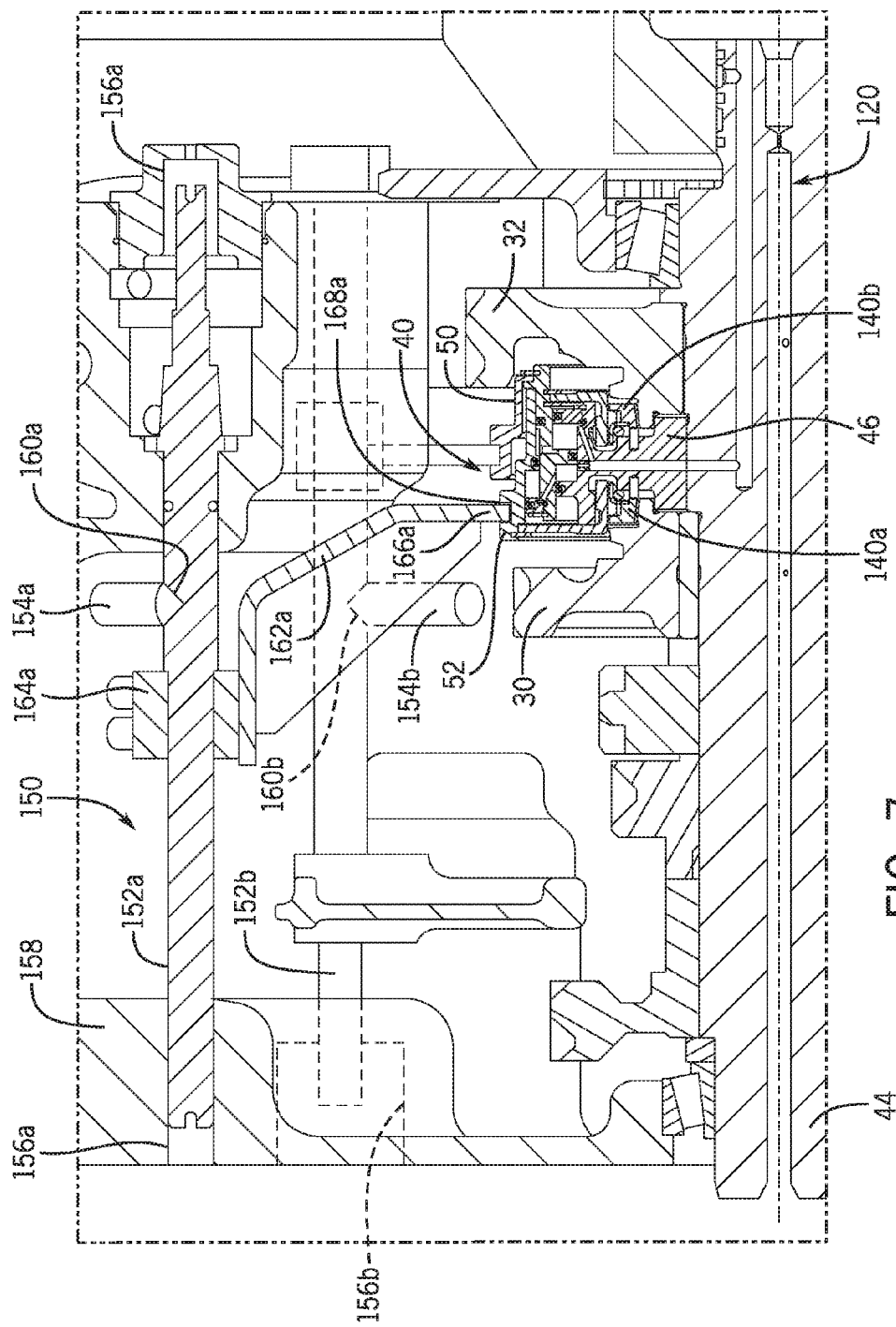
FIG. 7 is another partial sectional view similar to FIG. 2 albeit enlarged and focusing on a sensor rail arrangement of the example forkless synchronizer arrangement.
Figure 8:
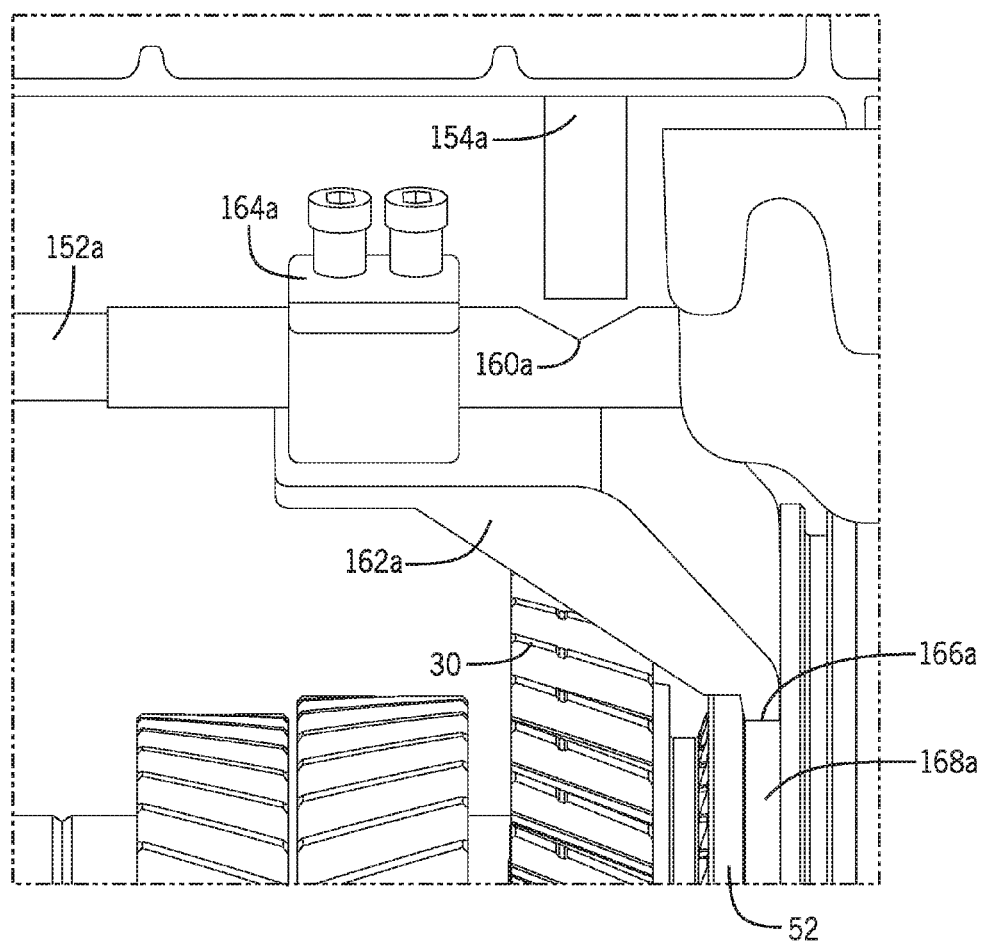
FIG. 8 is enlarged sectional view of area 8-8 of FIG. 7 showing an example profiled sensor rail recess.

With continued reference to FIG. 2 and also to FIGS. 6-8, an example sensor rail arrangement will now be described in the context of the example synchronizer 40 and gears 30, 32 described above. The example sensor rail arrangement 150 includes a rail corresponding to each shift collar or gear, which in the example synchronizer 40 includes two shift collars 100, 102 for associated gears 30, 32, and thus includes two rails 152*a* 152*b*. Systems for use with fewer or a greater number of shift collars or gears may have correspondingly fewer (e.g., one) or a greater number of rails (e.g., three or more). Similarly, the example sensor rail arrangement 150 includes a corresponding number of sensors, here sensors 154*a*, 154*b*, for detecting the axial position of the corresponding rails 152*a*, 152*b*. Again, systems having fewer or a greater number of rails may have correspondingly fewer (e.g., one) or a greater number of sensors (e.g., three or more). Alternatively, one or more individual sensors may be positioned to detect the position of multiple rails, and the controller 24 may accordingly be configured to resolve multiple rail positions from multiple rails through the feed input of such a sensor. The rails may be differentiated in such a case using various techniques, including by using rails of disparate properties (e.g., constituent materials, mass or other characteristics) that result in sensor signals to the controller having different characteristics (e.g., amplitude, frequency, gain, etc.). Various other sensor technology and/or filtering techniques may be incorporated to differentiate the rails in such a case. The sensors 154*a*, 154*b* in the example sensor rail arrangement 150 are electromagnetic linear position sensors, (e.g., Hall Effect sensors), each detecting the axial position of a corresponding one of the rails 152*a*, 152*b*. As noted, however, any of various sensor technology may be used, including various capacitive, infrared, ultrasound, and laser sensors. Also, various sensor pairings (e.g., transmitter/receiver or transducer pairs) may be used in which one of the pair is mounted to a rail and the other of the pair is mounted elsewhere. In any event, each of the sensors 154*a*, 154*b* is coupled to the controller 24 by a suitable line, bus or wireless network.

In the example sensor rail arrangement 150, the rails 152*a*, 152*b* are elongated, generally cylindrical metallic rods. The rods may be conventional fork rods of a robust steel material. However, lighter, less expensive non-structural materials may be used since the rails are not required to carry loads. Moreover, other rail geometries may be used, and the length, cross-section profile, material properties and other characteristics may be the same or different for each rail 152*a*, 152*b*. The ends of the rails 152*a*, 152*b* in the illustrated example are slidably captured within inwardly axially opening pockets 156*a*, 156*b* in a sensor rail housing 158 or other structure (e.g., transmission housing). The pockets 156*a*, 156*b* support the rails 152*a*, 152*b*, while permitting axial translation. Bushings, collars, sleeves, surface treatments, etc. providing reduced coefficient of friction may be included to further facilitate relative sliding of the rails 152*a*, 152*b*. In the illustrated example, the sensors 154*a*, 154*b* are fixedly mounted (e.g., using suitable mechanical fasteners, adhesives, or various soldering or welding techniques) to the sensor rail housing 158 to detect the relative or absolute axial position of the corresponding rails 152*a*, 152*b*. Alternatively, one or more of the sensors may be mounted to move with the rails such that the sensors would be located and configured to detect surrounding structure other than the rails (e.g., a part of the sensor rail housing). In that case, the sensors would be directly or indirectly mounted to the rails (e.g., via a rod clamp).

The sensors 154*a*, 154*b* may be mounted to sense any part of the corresponding rails 152*a*, 152*b* (or surrounding structure) along the length of the rails 152*a*, 152*b*. In the illustrated example, the sensors 154*a*, 154*b* are situated proximate to a region of interest. Such a region of interest may be formed in or attached to the rails 152*a*, 152*b* (or surrounding structure) and be configured to improve position detection and/or the feed signal to the controller 24. As one example, a profiled groove 160*a*, 160*b* is formed (e.g., machined) into each rail 152*a*, 152*b* at a location along its length that is proximate to the position of the associated sensor 154*a*, 154*b* corresponding to an engaged state (or alternatively the neutral state) of the synchronizer 40. Moreover, the region of interest groove 160*a*, 160*b* has a profile that affects the feed signal of the sensor. In the illustrated example, each groove 160*a*, 160*b* is a "V" groove configured to provide a stronger, more consistent and more linear signal. The profiled V-groove may have a valley that is either troughed (i.e., flat-bottomed) or sharply angled, sides that are linear or curved (with or without a change of inflection) and either aligned with the rail axis (or axis R) or at an angle (e.g., 90 degrees) thereto.

In the example synchronizer 40 described above, the sensor rail arrangement 150 detects the state of engagement of the synchronizer 40 with respect to either gear 30, 32 by axial movement of one of the rails 152a, 152b in response to axial shifting of one of the shift collars 100, 102. This is achieved in the example embodiment by a direct, mechanical tie between the rails 152a, 152b and the inner and outer rings 50, 52 in the form of rail arms 162a, 162b. Each rail arms 162a, 162b is axially fixedly coupled with respect to the associated rail 152a, 152b and relatively rotationally coupled with respect to the associated inner and outer rings 50, 52. The rail arms 162a, 162b and their connections may be configured and achieved in various ways either as assemblies or unitary components. Further, in the illustrated example, the rail arms 162a, 162b are of different constructions and sizes as needed to span the different spaces between the rails 152a, 152b and their associated ring 50, 52, however, they may be of the same shape/construction in other applications. Like the rails 152a, 152b, the rail arms 162a, 162b may be light-weight and made of less costly, non-structural materials given that they are not transmitting high loads to the rails 152a, 152b.

In the illustrated example, albeit of different lengths and configurations, the rail arms 162a, 162b are each directly coupled to the associated rails 152a, 152b via rail clamps 164a, 164b, which are rigid blocks with axial bores and transverse threaded fasteners that clamp against the rails 152a, 152b. The rail claims 164a, 164b facilitate assembly to the rails 152a, 152b by allowing for axial position adjustment (i.e., sliding) prior to fastening. The other ends of the rail arms 162a, 162b couple to the rings 50, 52 via a tongue and groove connection that permits relative rotation (i.e., allows the rings 50, 52 to turn with the drive shaft 44) while transferring axial movement. In the illustrated example, the rail arms 162a, 162b form the tongue members and the rings 50, 52 form the groove members, however, this may be reversed. Specifically, the rail arms 162a, 162b have narrowed ends 166a, 166b configured with arcuate surfaces, each following a radius approximating that of an outwardly opening circumferential groove 168a, 168b of the corresponding ring 50, 52. Variations in the radius (or even linearity) of the interfacing surface of the rail arm ends 166a, 166b is possible provided that ring rotation is not impeded and ring translation is transmitted.

The sensor rail arrangement 150 may be configured to sense, that is to say to signal the controller 24, either when the synchronizer 40, and thereby the transmission, is in a neutral state, an engaged state, or both. In the example embodiment, the sensor rail arrangement 150 signals the controller 24 when either gear 30, 32 is engaged. In operation then, application of hydraulic pressure to the synchronizer 40 moves either combination of rings 50, 52, shift collars 100, 102, rail arms 162a, 162b and rails 152a, 152b from a neutral axial position to an engaged axial position. In the engaged axial position, the groove 160a, 160b of the associated rail 152a, 152b is in registration (i.e., in close radial proximity) with the associated sensor 154a, 154b, which transmits an "engaged" state feed signal to the controller 24. The controller 24 may use the feed signal to process the engaged state signal for various machine control, state verification and operator feedback uses. For example, in the illustrated example, the controller 24 is programmed (e.g., through process code stored in onboard memory architecture) to process the feed signal to confirm gear engagement in a transmission control scheme and also to output a gear indicator to the operator interface 26.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A synchronizer arrangement for selectively coupling one or more gears to a drive shaft that is rotatable about a rotation axis, the synchronizer arrangement comprising:
   a housing;
   a shift collar rotated by the drive shaft, the shift collar being configured to be disengaged from a first of the gears when in a first neutral axial position and to be engaged with the first gear when in a first engaged axial position to transmit rotational input from the drive shaft to the first gear;
   a rail arranged in parallel with the rotation axis and coupled to the housing to move without carrying shifting loads;
   a rail arm having an end fixedly coupled to the rail and another end coupled to the shift collar to permit relative rotation and to transmit axial movement to the rail in response to axial movement of the shift collar between the first engaged and neutral axial positions; and
   a sensor arranged proximate the rail to sense an axial position of the rail.

2. The synchronizer arrangement of claim 1, further including an annular ring disposed coaxially about and rigidly connected to the shift collar, the annular ring having an annular groove extending along its outer periphery and opening in a radially outward direction.

3. The synchronizer arrangement of claim 2, wherein the end of the rail arm coupled to the shift collar is configured, at least in part, to fit within the annular groove.

4. The synchronizer arrangement of claim 3, wherein the end of the rail arm coupled to the shift collar has an arcuate axial surface having a radius of curvature substantially the same as that of a bottom surface of the annular groove.

5. The synchronizer arrangement of claim 1, wherein the end of the rail arm coupled to the rail is coupled by a threaded rod clamp.

6. The synchronizer arrangement of claim 1, wherein the rail has a profiled recess along its length sensed by the sensor.

7. The synchronizer arrangement of claim 6, wherein the recess has a symmetric profile including a central valley extending along a line substantially orthogonal to the rotation axis and linear sides on opposite axial sides of the valley.

8. The synchronizer arrangement of claim 2, further including a shaft hub configured to be rotated with the drive shaft, the shaft hub having a splined annulus;
   wherein the annular ring and the shift collar are disposed concentrically about the shaft hub and movable along the rotation axis with respect to the shaft hub; and
   wherein the shift collar has a splined annulus engaged with the splined annulus of the shaft hub.

9. The synchronizer arrangement of claim 8, further including:
   a second shift collar rotated by the drive shaft, the second shift collar being configured to be disengaged from a second of the gears when in a second neutral axial position and to be engaged with the second gear when in a second axial position to transmit rotational input from the drive shaft to the second gear;
   a second rail arranged in parallel with the rotation axis and coupled to the housing to move without carrying shifting loads;
   a second rail arm having an end fixedly coupled to the rail and another end coupled to the second shift collar to permit relative rotation and to transmit axial movement to the second rail in response to axial movement of the second shift collar between the second engaged and neutral axial positions; and
   a second sensor arranged proximate the second rail to sense an axial position of the second rail.

10. The synchronizer arrangement of claim 9, further including a second annular ring disposed coaxially about and rigidly connected to the second shift collar, the second annular ring having a second annular groove extending along its outer periphery and opening in a radially outward direction;
   wherein the end of the second rail arm coupled to the second shift collar is configured, at least in part, to fit within the second annular groove.

11. The synchronizer arrangement of claim 10, wherein the shaft hub has a second splined annulus; and
   wherein the second shift collar has a splined annulus engaged with the splined second annulus of the shaft hub.

12. The synchronizer arrangement of claim 1, wherein the shift collar is configured to be moved between the first engaged and neutral axial positions by hydraulic pressure, and thereby axially shift the rail.

13. A synchronizer arrangement for selectively coupling a first gear or a second gear to a drive shaft that is rotatable about a rotation axis, the synchronizer arrangement comprising:
   a housing;
   first and second rails arranged in parallel with the rotation axis and coupled to the housing to move without carrying shifting loads;
   a first shift assembly concentrically disposed about and rotated by the drive shaft, the first shift assembly being configured to be disengaged from the first gear when in a first neutral axial position and to be engaged with the first gear when in a first engaged axial position to transmit rotational input from the drive shaft to the first gear, the first shift assembly having a first rail arm coupled to the first rail to transmit axial movement to the first rail in response to axial movement of the first shift assembly between the first engaged and neutral axial positions;
   a second shift assembly concentrically disposed about and rotated by the drive shaft, the second shift assembly being configured to be disengaged from the second gear when in a second neutral axial position and to be engaged with the second gear when in a second engaged axial position to transmit rotational input from the drive shaft to the second gear, the second shift assembly having a second rail arm coupled to the second rail to transmit axial movement to the second rail in response to axial movement of the second shift assembly between the second engaged and neutral axial positions; and
   first and second sensors arranged proximate the respective first and second rails to sense axial positions of the first and second rails.

14. The synchronizer arrangement of claim 13, wherein the first shift assembly includes a first shift collar and a first annular ring disposed coaxially about and rigidly connected to the first shift collar, the first annular ring having a first annular groove extending along its outer periphery and opening in a radially outward direction, the first rail arm is configured to couple to the first shift collar by, at least in part, engagement with the first annular groove; and
   wherein the second shift assembly includes a second shift collar and a second annular ring disposed coaxially about and rigidly connected to the second shift collar, the second annular ring having a second annular groove extending along its outer periphery and opening in a radially outward direction, wherein the second rail arm is configured to couple to the second shift collar by, at least in part, engagement with the second annular groove.

15. The synchronizer arrangement of claim 14, wherein the first and second rail arms are coupled to the respective first and second shift collars by first and second arcuate axial surfaces being disposed within the first and second annular grooves; and
   wherein the first and second arcuate axial surfaces have radii of curvature substantially the same as that of bottom surfaces of the respective first and second annular grooves.

16. The synchronizer arrangement of claim 14, further including a shaft hub configured to be rotated with the drive shaft, the shaft hub having first and second splined annuli;
   wherein the first annular ring and the first shift collar are disposed concentrically about the shaft hub and movable along the rotation axis with respect to the shaft hub, and the first shift collar has a first splined annulus engaged with the first splined annulus of the shaft hub; and
   wherein the second annular ring and the second shift collar are disposed concentrically about the shaft hub and movable along the rotation axis with respect to the shaft hub, and the second shift collar has a second splined annulus engaged with the second splined annulus of the shaft hub.

17. The synchronizer arrangement of claim 13, wherein the first and second rail arms are coupled to the respective first and second rails by threaded rod clamps.

18. The synchronizer arrangement of claim 13, wherein the first and second rails have respective first and second profiled recesses along their length sensed by the respective first and second sensors.

19. The synchronizer arrangement of claim 18, wherein the first and second recesses have symmetric profiles each including a central valley extending along a line substantially orthogonal to the rotation axis and linear sides on opposite axial sides of the valley.

20. The synchronizer arrangement of claim 13, wherein the first and second shift assemblies are configured to be moved between the respective first and second engaged and neutral axial positions by hydraulic pressure, and thereby axially shift the respective first and second rails.

* * * * *

UNITED STATES PATENT AND TRADEMARK OFFICE
CERTIFICATE OF CORRECTION

| | |
|---|---|
| PATENT NO. | : 9,976,650 B1 |
| APPLICATION NO. | : 15/421739 |
| DATED | : May 22, 2018 |
| INVENTOR(S) | : Singh et al. |

Page 1 of 1

It is certified that error appears in the above-identified patent and that said Letters Patent is hereby corrected as shown below:

On the Title Page

Item "*", Column 1, in "Notice", Line 3, after "0 days." delete "days.".

Item "56", Column 2, under "Foreign Patent Documents", Line 3, delete "201610515" and insert -- 2016105155 --, therefor.

Signed and Sealed this
Twelfth Day of February, 2019

Andrei Iancu
*Director of the United States Patent and Trademark Office*